United States Patent [19]

Sommer

[11] 4,432,443
[45] Feb. 21, 1984

[54] CLUTCH AND BRAKE AND IMPROVED UNIVERSAL COUPLING

[75] Inventor: Gordon M. Sommer, Boca Raton, Fla.

[73] Assignee: Sommer Co., Warren, Mich.

[21] Appl. No.: 226,635

[22] Filed: Jan. 21, 1981

[51] Int. Cl.³ ............................................ B60K 41/24
[52] U.S. Cl. .............................. 192/12 R; 192/18 A; 192/112; 74/572
[58] Field of Search .................. 192/18 R, 18 A, 112, 192/12 R, 12 C; 74/572, 606 R; 403/335, 337, 338, 378, 379

[56] References Cited

U.S. PATENT DOCUMENTS

| 2,596,821 | 5/1952 | Parkins | 403/379 X |
| 3,614,999 | 10/1971 | Sommer | 192/18 A |
| 3,709,534 | 1/1973 | Coe | 403/379 X |
| 3,713,517 | 1/1973 | Sommer | 192/18 A |
| 4,096,931 | 6/1978 | Whitehurst | 192/18 A |
| 4,135,611 | 1/1979 | Spanke | 192/18 A |

Primary Examiner—George H. Krizmanich
Attorney, Agent, or Firm—Harness, Dickey & Pierce

[57] ABSTRACT

An improved clutch and brake unit in combination with a rotatable flywheel, the clutch and brake unit having a housing assembly forming a reservoir chamber around a portion of the drive shaft of a machine and surrounding the clutch and brake unit which permit the housing assembly, clutch and brake unit, and shaft to be removably secured as one unit to the rotatable flywheel. A universal coupling is also disclosed, used in combination with an output shaft of a drive assembly and an extension shaft of a driven assembly, comprising radially outwardly extending flanges at the adjacent ends of each shaft, a mating boss on one shaft matable into a recess in the other shaft to dispose the shafts such that the flanges are adjacent one another, a key inserted in a transversely disposed keyway disposed in part within each shaft, a retainer to hold the shafts together at the flanges and retain the key and securement to secure the retainer to the shafts.

12 Claims, 6 Drawing Figures

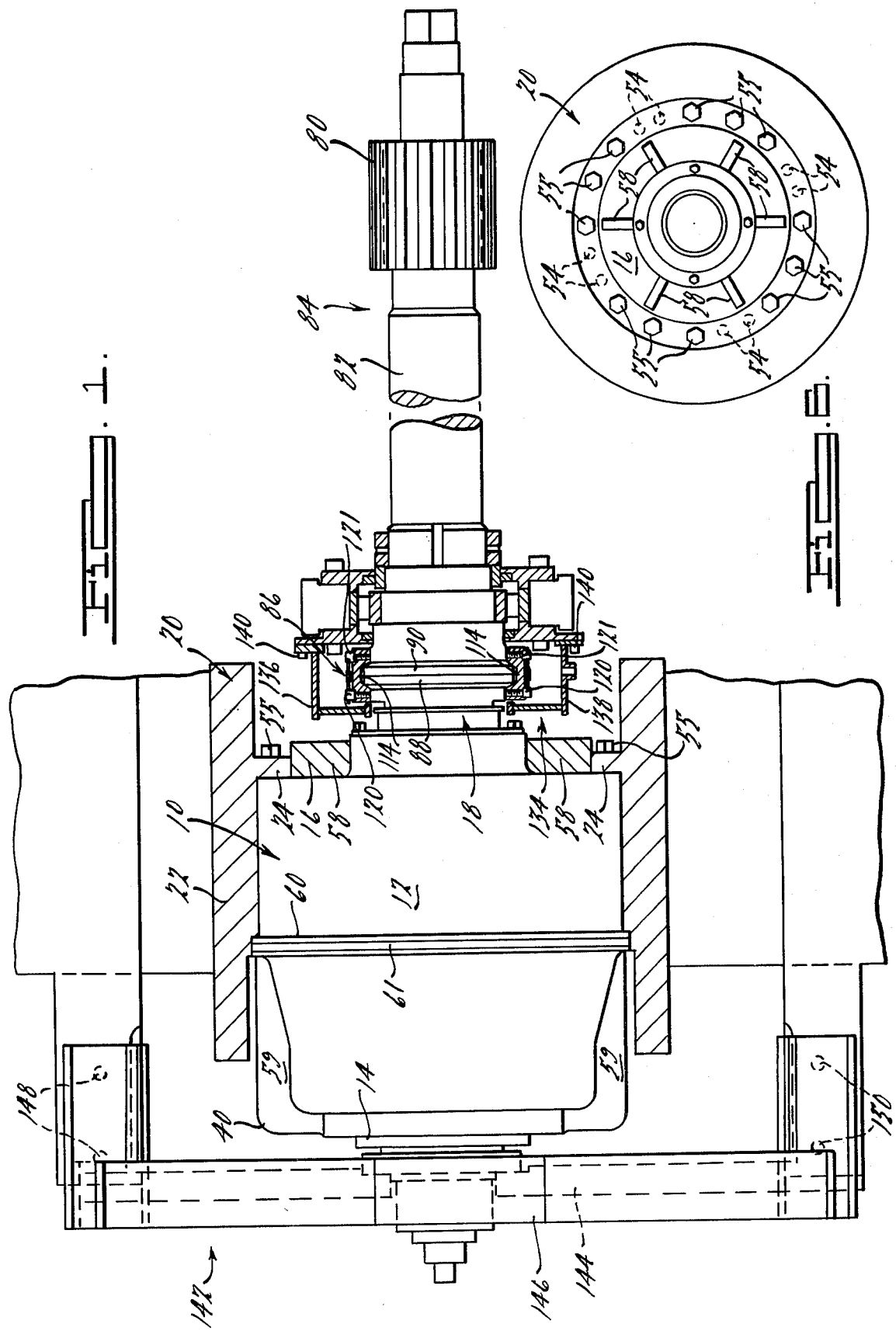

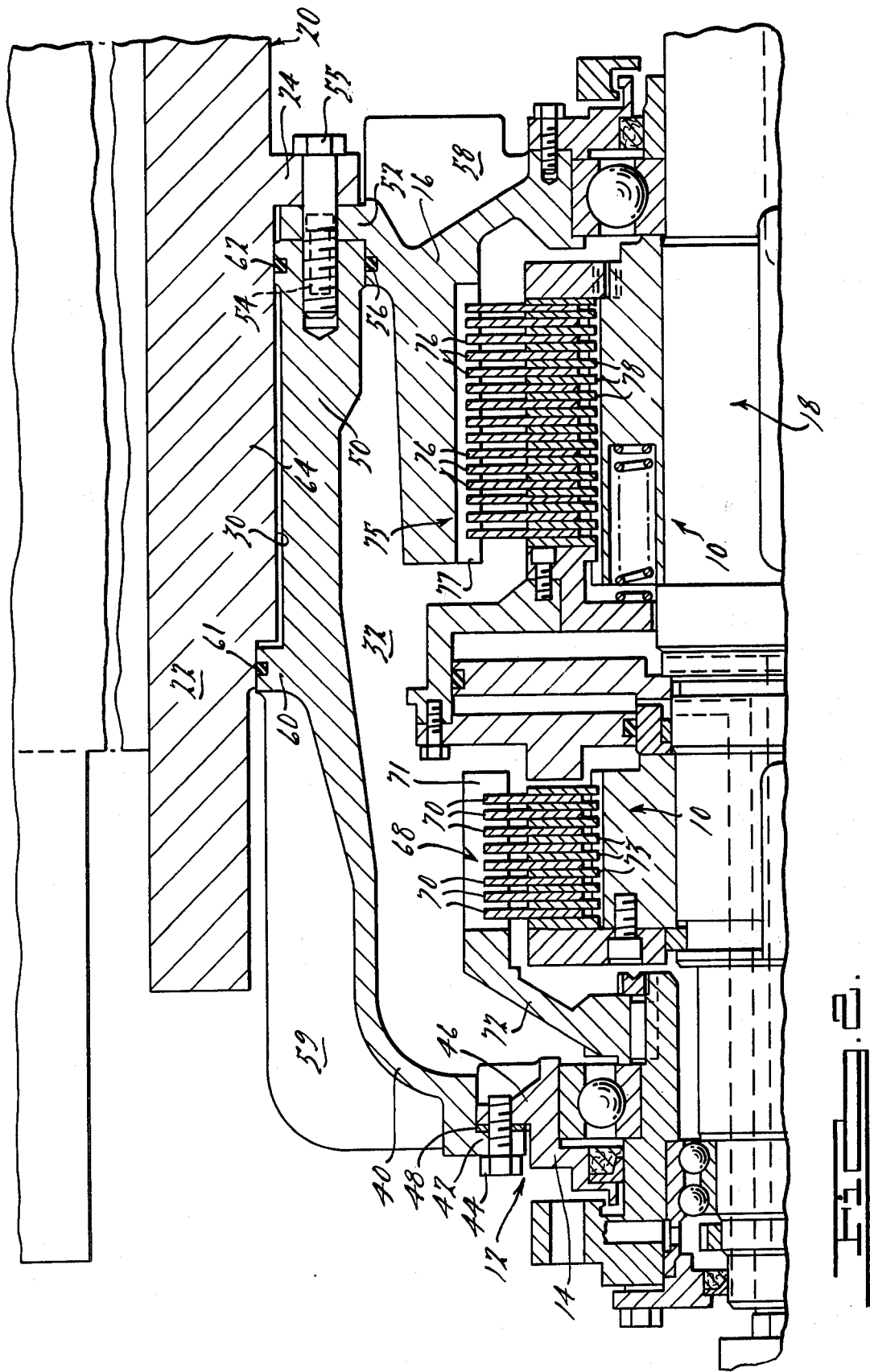

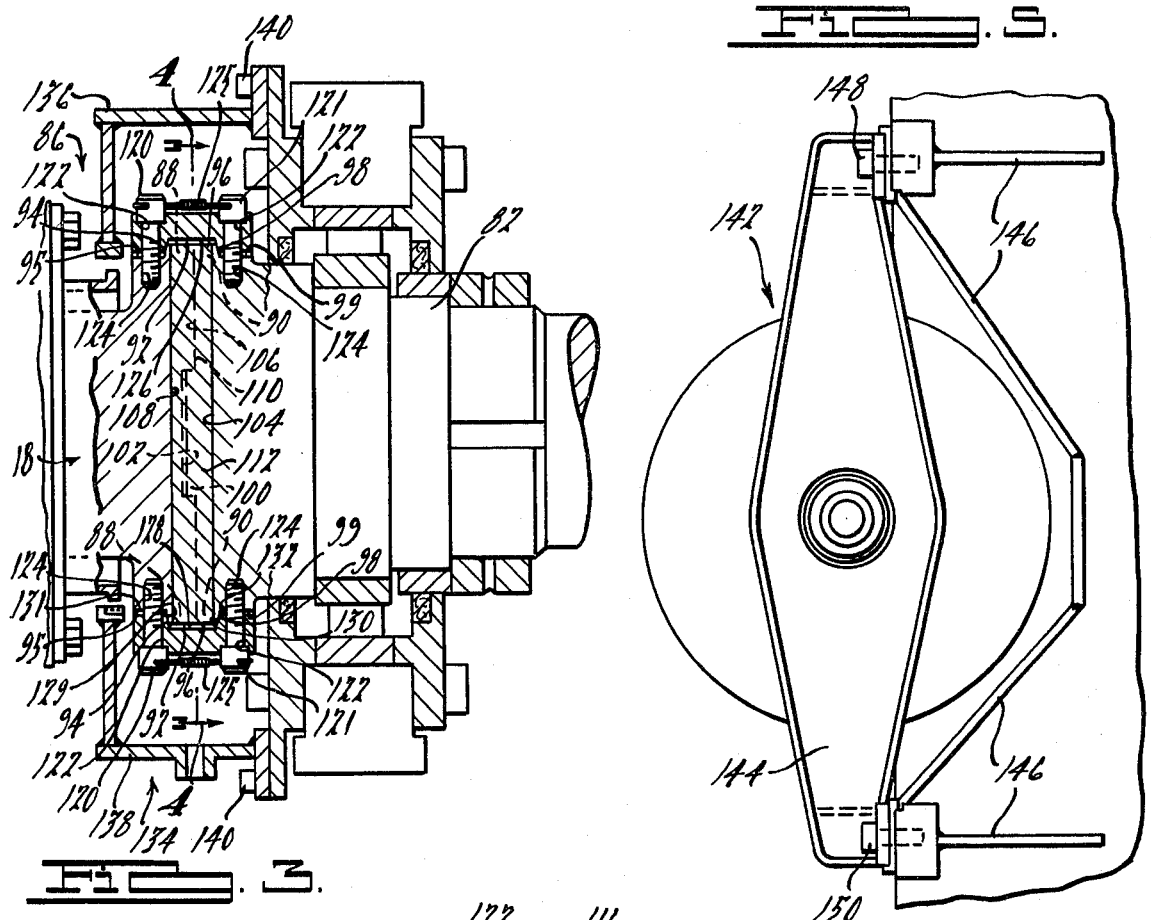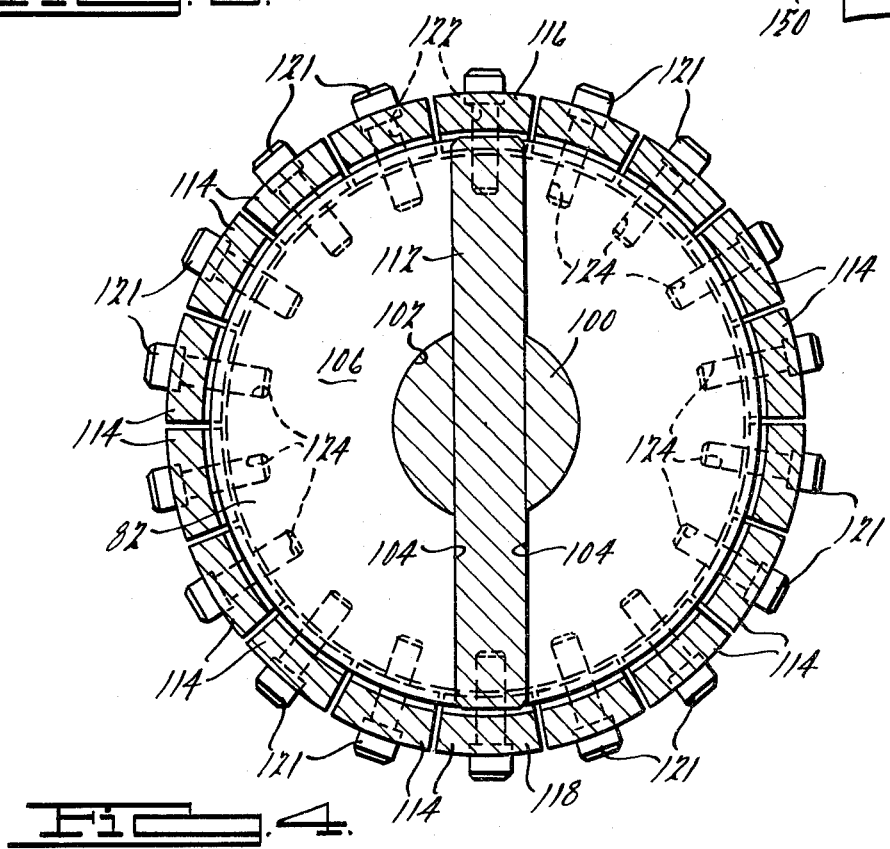

1

CLUTCH AND BRAKE AND IMPROVED UNIVERSAL COUPLING

BACKGROUND AND SUMMARY OF THE INVENTION

This invention relates generally to clutch-brake units and, more particularly to a new and improved oil-cooled clutch-brake unit adapted particularly, although not necessarily, for use in operative association with punch presses and the like such as that disclosed in applicant's U.S. Pat. No. 3,614,999, issued Oct. 26, 1971.

It is accordingly a general object of the present invention to provide a new and improved clutch-brake unit. It is a more particular object of the present invention to provide a new and improved clutch-brake unit that is extremely small or compact in size.

Several disadvantages exist with respect to clutch and brake units conventionally utilized in heavy machinery such as punch presses and the like. In particular, both the removal and the repair of clutch and brake units produce excessive down time for the punch press or other machine with which the clutch is used, particularly when the clutch wears out on a much-needed, operating machine. The present clutch and brake unit is directed to provide for easier removal and quick repair than any unit existing in the prior art. These advantages are also coupled with the object of the present invention to provide a new and improved clutch-brake unit that is adapted to be mounted directly within the hub of a rotating member, such as, for example, a rotatable flywheel.

Machinery down time can also be reduced if the clutch and brake units are easily interchangeable between units and universal to more than one unit. Thus, if one machine is not in operation while the clutch of another wears out, the clutch-brake units can be interchanged with minimal down time and the worn out clutch can be repaired prior to the need for the operation of the second machine that had not presently been in use. Thus, it is another object of the present invention to provide a new and improved clutch-brake unit that will find universality of application, and also have a universal coupling which can be made applicable to a variety of both new and old machines and provide optimum high strength coupling therewith.

Further important objects of the present invention are to provide a new and improved clutch-brake unit which is simple in design, economical to manufacture and operate, extremely rugged and requiring little maintenance during operation, and where the input and output shafts are readily adapted for mounting to a number of associated machines, gear, sheaves, etc. An additional advantage is that a limited number of units and couplings are applicable to a substantial number of machine applications.

Other objects and advantages of the present invention will become apparent from the following detailed description taken in conjunction with the accompanying drawings.

BRIEF DESCRIPTION OF THE DRAWINGS

FIG. 1 is an elevated side view of the clutch unit of the present invention situated in the flywheel of a punch press, having portions broken away and portions of the punch press in section;

FIG. 2 is an enlarged side sectional view of the clutch-brake unit illustrated in FIG. 1;

FIG. 3 is an enlarged sectional view of the coupling of FIG. 1;

FIG. 4 is a sectional view of the coupling of FIG. 3 along the line 4—4 thereof;

FIG. 5 is an elevated end view of the quill portion of the unit of FIG. 1; and

FIG. 6 is an elevated schematic end view of the unit assembled within a flywheel.

DETAILED DESCRIPTION OF THE PREFERRED EMBODIMENT

Generally speaking, the clutch-brake unit of the present invention is an improvement over that disclosed in applicant's U.S. Pat. No. 3,614,999, issued Oct. 26, 1971, and incorporated by reference herein. The present invention is adapted to find particularly useful application in connection with the flywheel or similar rotatable member of a metal forming or stamping press or the like. Although the present invention will find varied use in many other types of applications, as will more particularly be described, due to the specially useful application of the present invention with a typical rotary flywheel, the present invention is shown and described, by way of example in operative association therewith.

Referring now in detail to the drawings and in particular to FIGS. 1 and 2, a clutch-brake unit 10, in accordance with the present invention, is shown generally as comprising a rotatable housing assembly 12 having a pair of end wall members 14 and 16 which are spaced axially or longitudinally along a rotatable drive shaft, generally designated by the numeral 18. The housing 12 forms an inner hub assembly for operatively connecting a rotatable flywheel, generally designated 20, to the shaft 18, with the flywheel 20 including an axially extending annular sleeve or collar section 22, having a radially inwardly extending annular flange 24, and defining a central axially extending bore 30 spaced radially outwardly from the periphery of the shaft 18 defining one marginal wall portion of an internal cavity 32 (FIG. 2) within which are located the clutch and brake elements of the present invention. One axial end of the cavity 32 is closed by the end wall 16. The end of the cavity 32 opposite that which is closed by the end wall member 16 is adapted to be closed by the end wall member 14 and a generally axially and radially outwardly extending enclosure member, generally designated by the numeral 40. The member 40 is formed with a radially inwardly extending flange section 42 at one axial end thereof, which section 42 is fixedly secured by means of a plurality of circumferentially spaced, axially extending suitable screws, bolts or the like 44 to a radially outwardly projecting shoulder 46 formed around the outer periphery of the member 14, suitable fluid-tight gasket means 48 being provided between the confronting sides of the sections 42 and 46. The opposite end of the member 40 is formed with an axially extending section 50 adapted to bear against an annular, radially extending L-shaped flange 52 of the end wall 16. The end wall 16 is attached to enclosure member 40 by a series of circumferentially spaced jack screws 54 (FIG. 6). The end wall 16 and enclosure member 40 combination is then secured to the annular flange 24 of the flywheel 20 to secure the combination together by means of a plurality of circumferentially spaced bolts 55 (FIG. 6), with suitable O-ring means or the like 56 being provided interjacent the confronting surfaces of the section 50 and flange 52 to provide concerted orienting between the end wall 16 and the enclosure member 40. The members 16 and 40 are preferably provided with circumferentially spaced, axially extending ribs or fins, generally designated 58 and 59, for purposes of heat dissipation.

The enclosure member 40 also includes a radially outwardly extending annular flange 60 and O-ring means 61 and 62, one 61 at the flange 60 and the other 62 at the extreme of the enclosure member 40 adjacent the end wall 16, whereby the housing assembly 12 is oriented by means 61 and 62 when the assembly 12 is positioned in the central bore 30 of the flywheel 20 with the flange 60 of the enclosure member 40 disposed adjacent a radially inwardly extending annular portion 64 of the flywheel 20. With the above described configuration, the housing assembly 12, the clutch-brake unit 10, and the shaft 18 may be detached from the flywheel 20 as a unit by detachment of bolts 55 without the substantial number of manipulative steps as has been required in the prior art.

Briefly, in operation, the flywheel 20 is adapted to be rotated through suitable rotation of a plurality of V-belts (not shown) peripherally engaged therewith. Rotation of the flywheel 20 is adapted to be selectively transmitted via the clutch-brake unit 10 of the present invention to the drive shaft 18. The clutch-brake unit 10 normally has the brake elements thereof engaged so as to preclude rotation of the drive shaft 18 even though the flywheel 20 may be rotating; however, upon actuation of the unit 10, the braking elements will be released and the clutching elements will be engaged so that the flywheel 20 will be drivingly connected to the drive shaft 18.

The details of the operation of the clutch and brake portions of the unit 10 are described in detail in U.S. Pat. No. 3,614,999, and will not be repeated here, other than to note first that the brake 68 comprises a plurality of relatively non-rotatable brake plates 70 adapted for keyed engagement with a plurality of circumferentially spaced, longitudinally extending drive lugs 71 mounted upon a generally conically shaped lug support member 72 disposed coaxially of the shaft 18, and a plurality of brake discs 73 connected to the shaft 18 and, secondly, the clutch 75 comprises a plurality of clutch plates 76 rotatable with the end wall 16 of the housing assembly 12, adapted for keyed engagement with a plurality of circumferentially spaced, longitudinally extending lugs 77, and a plurality of clutch discs 78 connected to the shaft 18.

The drive shaft 18 may be directly coupled to a number of different machines or transmission means. In the present invention, with reference to FIG. 1, the drive shaft 18 transmits rotational power or torque from the flywheel 20 to a pinion gear 80 on an extension shaft 82 of a transmission assembly 84 via a coupling 86. The coupling 86 permits the clutch-brake unit 10 to be universally converted between different machines at a point to continue operations with a minimum of delay. One problem with a universal coupling of the type of the present invention is that space is very limited at the coupling. Thus, a rigid but compact coupling is presented herein to permit universal utilization to occur.

With reference to FIG. 3, the coupling 86 and shafts 18 and 82 are illustrated in assembly. The shafts 18 and 82 each have radially outwardly extending flanges 88 and 90, respectively, of compatible cross-sections. Flange 88 has a flat outer surface 92 from which a tapered surface 94 extends inwardly to the shaft 18 at surface 95. Flange 90 has an identical construction with flat surface 96 and tapered surface 98 extending to shaft surface 99. The shaft surfaces 95 and 99 may be constructed radially elevated from the main portion of the shaft 18 or 82 in certain applications, as illustrated, to make the coupling 86 more accessible.

Shaft 82 is mated to shaft 18 at boss 100 into recess 102. A keyway extends across the face 106 and boss 100 of shaft 82. A coordinate keyway 108 extends across the face 110 of said shaft 18. A face key 112 is inserted through keyways 104 and 108 to not only give added strength in the plane transverse to the shafts 18 and 82 parallel to face 106, but also to provide such strength in a limited amount of space.

Referring to FIGS. 3 and 4, several retainer segments 114, eighteen in number in the illustrated embodiment, are secured to both shafts 18 and 82 by a double row of a series of circumferentially spaced bolts 120, 121 inserted through apertures 122 in said segments 114 into threaded bores 124 in the flat surfaces 95 and 99 of the shafts 18 and 82 respectively. Each pair of bolts 120, 121 is joined by a safety wire or spring 125. The upper 116 and lower 118 segments also retain the face key 112 in place. The number of segments 14 may be as few as two in certain applications.

The segments 114 have an inner surface coordinated to the surfaces of the flanges 88 and 90. Each inner surface 126 of each segment 114 has an intermediate flat portion 128, tapered surfaces 129 and 130 converging radially inwardly from said intermediate portion 128, and axially outer portions 131 and 132. When each said segment 114 is secured to said shafts 18 and 82, the tapered surfaces 129 and 130 of the segments 114 act against the tapered surfaces 94 and 98 of the shafts to further clamp the shafts 18 and 82 toward one another into secure engagement. This again gives even further strength to the coupling while shortening the axial dimension of the coupling to permit it to be utilized in restricted spaces and be used universally with respect to the myriad number of possible machines with which the clutch-brake unit 10 can be used.

The labrynth drain 134 is also modified to accommodate the improved coupling 86, comprising two pieces 136 and 138 for ready removability once circumferentially spaced bolts 140 are unsecured.

The improved construction of the clutch-brake unit 10 and housing assembly 12 as described above permits ready detachment and removal of the unit for replacement with another unit and/or repair of the removed unit. The coupling 86 is detached, thus separating shaft 18 from shaft 92 of the transmission assembly. The quill 142 of the assembly (FIG. 5) is modified such that the shaft support 144 is removable from the mounting bracket 146 at bolts 148 and 150 and the mounting bracket 146 has a generally C-shaped configuration so as not to interfere with the unit 10 as it is extracted from the flywheel 20. When replacement or repair of the clutch-brake unit 10 is desired, bolts 148 and 150 are removed from the quill 142 and bolts 55 are removed. The clutch-brake unit 10, housing assembly 12, and shaft 18 can then be removed as a unit from the flywheel 20 from the input end of the unit 10. Jack screws 54 are then removed for access to the clutch-brake unit 10 so that repair or replacement can be performed. The process is then reversed for replacement of a functioning unit into the flywheel.

While it will be apparent that the preferred embodiment of the present invention is well calculated to provide the features and advantages stated above, it will be appreciated that the invention is susceptible to modification, variation and change without departing from the proper scope or fair meaning of the appended claims.

What is claimed is:

1. In combination with a rotatable flywheel having a central bore, a rotatable shaft adapted to be rotated by said flywheel, and a clutch-brake unit operably associated with said rotatable shaft,
   a housing assembly comprising a pair of end walls and an annular enclosure member extending between and attached to both of said end walls, said housing assembly forming a reservoir chamber around a portion of said shaft and surrounding said clutch-brake unit,
   means for removably securing said housing assembly, clutch-brake unit and said shaft as a unit to said flywheel, and
   means for orienting said housing assembly within said central bore of said flywheel disposed at an intermediate location on said housing assembly between said means for removably securing and one end wall of said housing assembly.

2. The combination as set forth in claim 1, wherein said clutch-brake unit comprises a brake comprising a plurality of relatively non-rotatable brake plates and a plurality of brake discs connected to said rotatable shaft and a clutch comprising a plurality of clutch plates rotatable with said housing assembly and a plurality of clutch discs connected to said rotatable shaft.

3. The combination as set forth in claim 1, wherein said flywheel has an interior bore and said housing assembly, clutch-brake unit and shaft are disposed within said bore when removably secured to said flywheel.

4. The combination as set forth in claim 1, wherein one of said sidewalls of said housing assembly has an annular mounting flange and said housing assembly further comprises means for attaching said sidewall to said end wall at said annular mounting flange.

5. The combination as set forth in claim 4, further comprising orienting means disposed between said annular mounting flange of said end wall and said sidewall.

6. The combination as set forth in claim 5, wherein said orienting means comprises O-ring means.

7. The combination as set forth in claim 4, wherein said flywheel has a radially inwardly extending annular mounting flange and said means for removably securing said housing assembly, clutch-brake unit and shaft as a unit to said flywheel extends through both said flywheel annular mounting flange and said end wall mounting flange into said housing assembly sidewall.

8. The combination as set forth in claim 7, wherein said means for removably securing said housing assembly to said flywheel is separate from said means for attaching said housing assembly sidewall to said one of said housing assembly end walls.

9. The combination as set forth in claim 1, further comprising an extension shaft of a driven assembly and a universal coupling comprising
   a radially outwardly extending annular flange on said shaft of said clutch-brake unit disposed at the output end of said shaft;
   a radially outwardly extending annular flange on said extension shaft disposed at the input end of said extension shaft;
   means for operably associating said clutch-brake unit shaft with said extension shaft to dispose said clutch-brake unit shaft flange and said extension shaft flange adjacent one another;
   means for retaining said flanges together disposed on both of said flanges when said flanges are disposed adjacent one another;
   means for securing said retaining means to both of said flanges;
   a keyway disposed transversely to the longitudinal axis of said shafts and disposed in part within said clutch-brake unit shaft and in part within said extension shaft; and
   a key insertable in said keyway.

10. A combination as set forth in claim 1, wherein said orienting means is comprised of a flexible material at least in part.

11. A combination as set forth in claim 1, wherein said orienting means includes flexible sealing means disposed at the outer periphery of said housing assembly and interfacing said central bore of said flywheel.

12. A combination as set forth in claim 1, wherein said annular enclosure member is secured to one of said end walls at the same location that said housing assembly is secured to said flywheel.

* * * * *